United States Patent [19]

Martin

[11] Patent Number: 4,523,730

[45] Date of Patent: Jun. 18, 1985

[54] ENERGY-ABSORBING SEAT ARRANGEMENT

[75] Inventor: John S. Martin, Denham, Near Uxbridge, England

[73] Assignee: Engineering Patents and Equipment Limited, St. Peter, Channel Islands

[21] Appl. No.: 437,361

[22] Filed: Oct. 25, 1982

[30] Foreign Application Priority Data

Nov. 2, 1981 [GB] United Kingdom ............... 8133001

[51] Int. Cl.³ ............................................. B64D 25/04
[52] U.S. Cl. ................................. 244/122 R; 297/216
[58] Field of Search ............ 244/122 R, 122 B, 118.6; 297/216; 188/371, 375

[56] References Cited

U.S. PATENT DOCUMENTS

| 3,181,821 | 5/1965 | Eddins ................................. 188/371 |
| 3,532,379 | 10/1970 | Reilly et al. . |
| 3,706,359 | 12/1972 | Skralskis ............................. 188/375 |
| 3,762,505 | 10/1973 | Morse ................................. 188/371 |
| 3,819,218 | 6/1974 | Liu ....................................... 188/371 |
| 3,985,388 | 10/1976 | Hogan ................................. 297/216 |
| 4,003,534 | 1/1977 | Kenigsberg et al. ............. 244/122 R |

FOREIGN PATENT DOCUMENTS

| 860841 | 2/1961 | United Kingdom . |
| 998536 | 7/1965 | United Kingdom . |
| 998535 | 7/1965 | United Kingdom . |
| 1043695 | 9/1966 | United Kingdom . |
| 1259198 | 1/1972 | United Kingdom . |
| 1353403 | 5/1974 | United Kingdom . |
| 1485894 | 9/1977 | United Kingdom . |
| 2009881 | 6/1979 | United Kingdom . |
| 1580372 | 12/1980 | United Kingdom . |
| 1583399 | 1/1981 | United Kingdom . |

Primary Examiner—Galen L. Barefoot
Attorney, Agent, or Firm—Spencer & Frank

[57] ABSTRACT

An energy absorbing seat arrangement, particularly for a helicopter, in which a seat pan is carried by a frame slidably mounted on parallel upwardly extending pillars secured to the helicopter. In normal conditions, downward sliding of the frame on the pillars is prevented, in one embodiment, by metal rods fixed with respect to the pillars, and extending through drawing dies fixed with respect to the seat frame. In a variant the rods and dies are replaced by a deformable metal tube and a mandrel extending through the tube. In the event of a crash in which rapid downward movement of the helicopter and the pillars is halted suddenly, the seat and seat frame continue to move downwardly, sliding along the pillars, while drawing of the rods through the dies, or drawing of the mandrel through the deformable tube, to dissipate the kinetic energy of the seat and its occupant relatively gradually.

3 Claims, 5 Drawing Figures

ENERGY-ABSORBING SEAT ARRANGEMENT

BACKGROUND OF THE INVENTION

This invention relates to an energy-absorbing seat arrangement intended to minimize the consequences to the occupant of a crash in a transport facility, for example an aircraft such as a helicopter, in which the seat arrangement is fitted.

As is known, the problems inherent in providing means whereby the pilot or other occupant of a helicopter may safely escape from the aircraft in an emergency are considerable, particularly having regard to the fact that these aircraft are generally used at low altitude, and accordingly, there has been considerable interest in energy-absorbing or "crash worthy" seat arrangements intended to minimize the consequences at least of a minor crash in a helicopter to a person who remains within the aircraft during the impact.

SUMMARY OF THE INVENTION

It is an object of the present invention to provide such an energy-absorbing seat arrangement which is simple and reliable in operation and which will not present a hazard in normal use.

According to the present invention there is provided an energy-absorbing seat arrangement including a first structure, including a seat pan, and a second structure adapted for fixing to an aircraft, vehicle or the like, said first structure being connected with said second structure by means including at least one deformable metal member arranged to undergo controlled, predetermined plastic deformation, in the event of the force acting between said first and second structure in at least one predetermined direction exceeding a predetermined value, in such a way as to allow controlled, energy-absorbing movement to take place between said structure under the action of said force.

In one embodiment of the invention, deformable metal members are provided in the form of elongate bolts which are drawn through dies under tension arising from impact or inertial forces in a crash situation, the drawing of said bolts through the dies serving to absorb the energy of the impact relatively gradually.

In another embodiment of the invention the bolts and dies are replaced by mandrels which are drawn through respective deformable tubular members to expand the same in the event of a crash.

DESCRIPTION OF THE PREFERRED EMBODIMENTS

Figure 1:
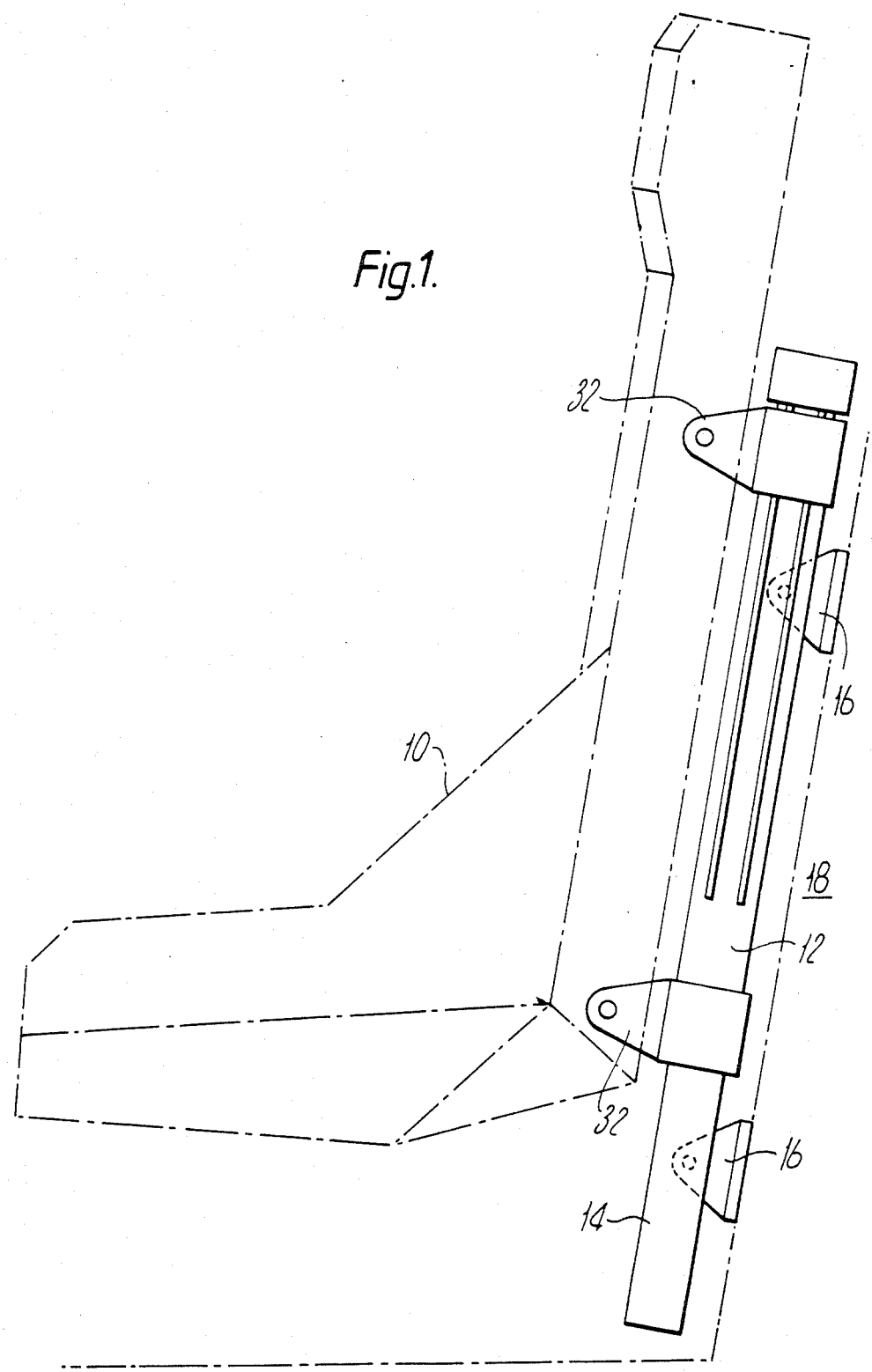
FIG. 1 is a schematic side elevation view showing a seat arrangement embodying the invention.
Figure 2:
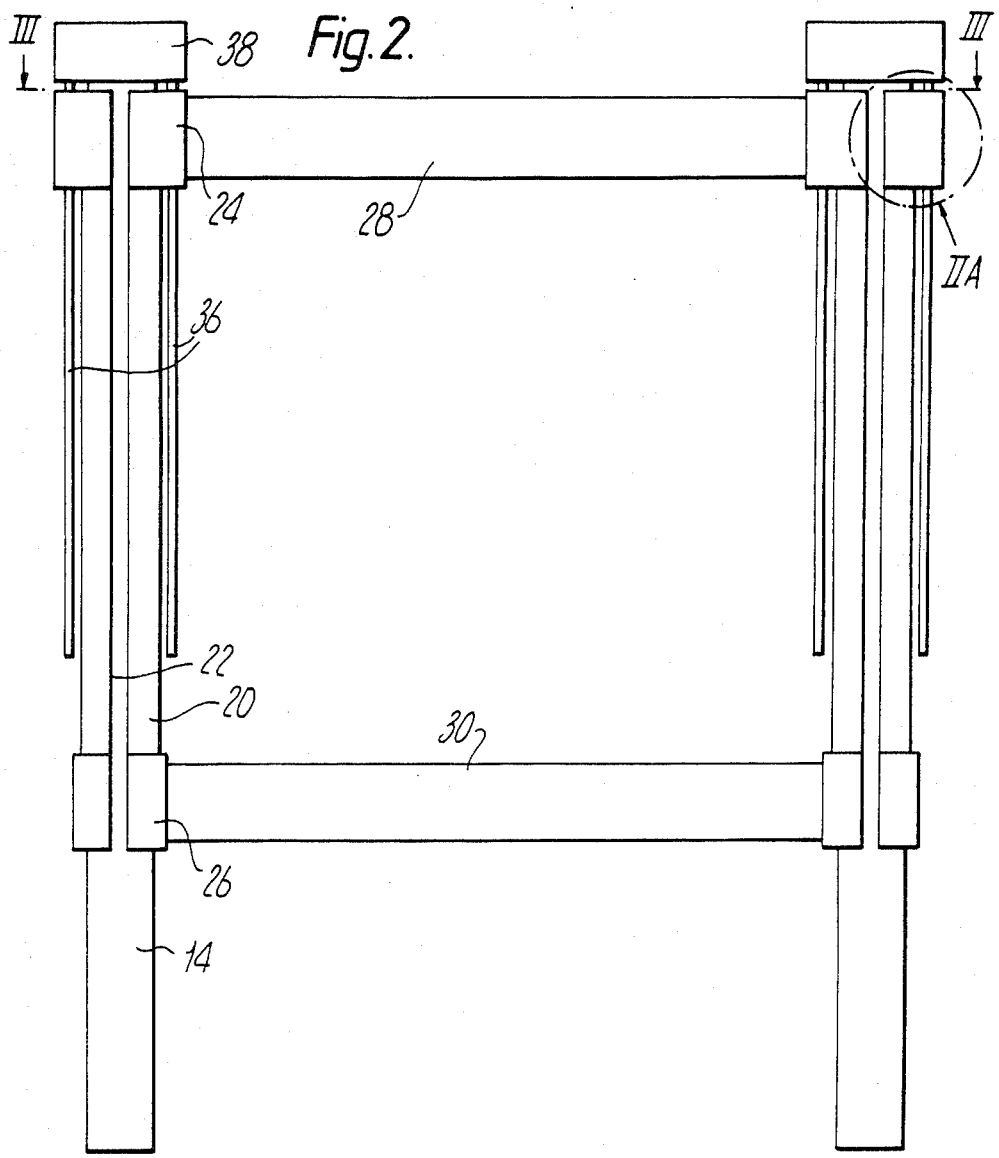
FIG. 2 is a rear elevation view of part of the seat arrangement of FIG. 1.
Figure 3:
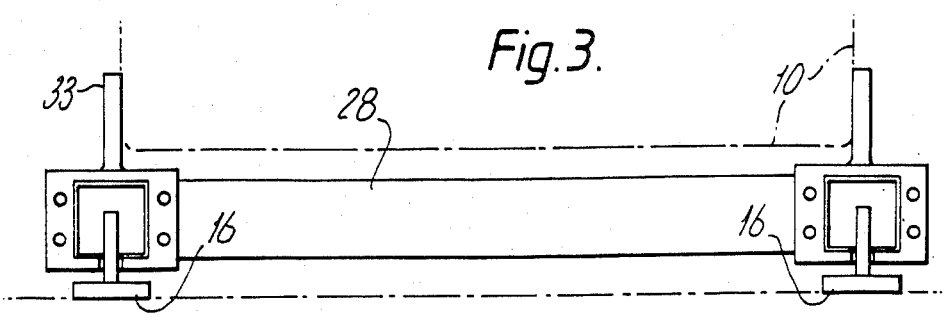
FIG. 3 is a schematic view in section along the line III—III in FIG. 2.

Referring to FIGS. 1 to 3, an energy absorbing seat arrangement comprises a first structure including a seat pan 10 and a frame 12 secured to the back-support part of the seat pan 10, and the seat arrangement further comprises a second structure, including two pillars 14 and brackets 16 by means of which the pillars 14 are secured to a frame part 18 indicated only diagrammatically in the figures.

The pillars 14, which may, as shown, be of square cross-section, are mounted parallel with one another and lie in respective vertical fore and aft planes. In the arrangement shown, the pillars 14 are also substantially parallel with the back of the seat pan 10, (although it will be appreciated that this is not essential) and so, in the arrangement shown, are, like the back of the seat pan 10, inclined slightly with respect to the vertical as viewed in side elevation in FIG. 1. The frame 12 is mounted for longitudinal sliding movement on the pillars 14 and comprises two sleeves 20 each being of substantially square cross section and receiving as a close sliding fit a respective one of the pillars 14, each sleeve 20 having a slot 22 formed through the rearwardly presented wall of the sleeve 20, down the middle thereof, from end to end of the sleeve, through which slot 22 extends the mounting flanges of the brackets 16 to which the respective pillar 14, disposed within the respective sleeve 20, is secured, for example by means of transverse pins lying within the confines of the respective pillar 14. Each sleeve 20 has at its upper and lower end a respective enlarged collar portion 24, 26, each traversed by the slot 22, the two sleeves 20 being interconnected by means of upper and lower transverse bars 28 and 30 respectively, each said transverse bar being fixed at each end thereof to a respective collar portion 24, 26 of the respective sleeve 20. The collar portions 24, 26 are also conveniently provided with forwardly projecting vertical flanges 32 which extend over the side walls of the seat pan and are bolted thereto.

Although the frame 12, and with it the seat pan 10 is, in principle, slidable longitudinally along the pillars 14, it is normally prevented from doing so by bolts 36, which, as explained in greater detail below, are fixed at their upper ends to cap members 38 fixed to the upper ends of the respective pillars 14, the bolts 36 extending through drawing dies carried by the collar portions 24 at the upper ends of the sleeves 20.

Figure 2A:
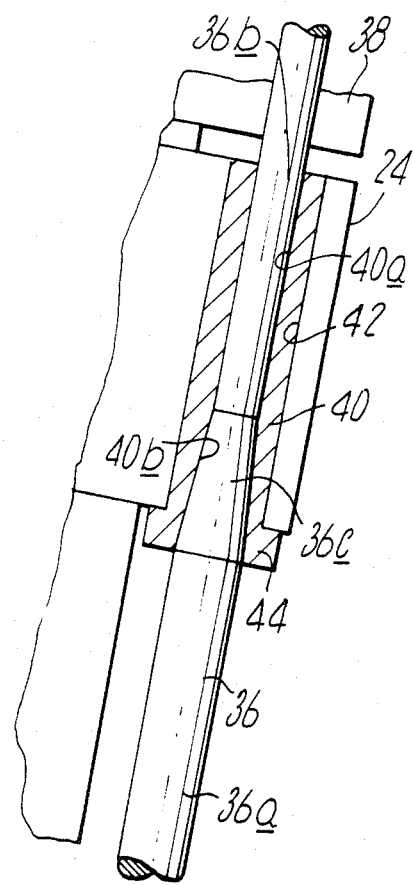
FIG. 2A is a view in vertical section of a detail of the seat arrangement corresponding to the area circled in FIG. 2.

As shown in FIG. 2A, each bolt 36 extends through a drawing passage in a respective drawing die 40 which is fitted within a respective bore 42 formed longitudinally through the collar portion 24, the die 40 having at its lower end a flange 44 which bears against the underside of the collar portion 24 and prevents the die 40 from being pulled upwardly through the bore 42.

Each bolt 36 is in the form of an elongate bar having a larger diameter cylindrical portion 36a, and a coaxial, smaller diameter cylindrical portion 36b connected by a frusto-conically tapering portion 36c coaxial with the portions 36a and 36b and being, at its respective axial ends, of the same diameters as the respective adjoining portions 36a and 36b. Each bolt 36 has its larger diameter portion 36a extending below the respective die 40 and has its smaller diameter portion 36b extending through the respective die 40 to the cap member 38.

The drawing passage extending longitudinally through each die 40 comprises an upper, smaller diameter, cylindrical portion 40a which receives, as a close fit, the portion 36b of the respective bolt 36, and a coaxial, lower, frusto-conically tapering portion 40b which is complementary with, and receives, as a close fit, the tapering portion 36c of the respective bolt 36.

As shown in FIG. 3, there are four bolts 36 associated with each pillar 14 and sleeve 20, two bolts 36 being disposed side by side on the side face of each sleeve 20 which faces towards the other sleeve 20 and on the opposite side face, the bolts 36 extending parallel with one another. Thus, each upper collar portion 24 correspondingly carries four correspondingly arranged dies 40 (not shown in FIG. 3) each receiving a respective one of the four bolts 36.

Operation of the seat arrangement described with reference to FIGS. 1 to 3 is as follows:

Suppose that the seat arrangement shown is installed in a helicopter, the rapid downward descent of which is arrested by the aircraft striking the ground. In this event, the occupant of the seat, together with the seat pan 10, frame 12, etc. will, due to the inertia thereof, exercise a substantial downward force on the dies 40 relative to the bolts 36, placing the portions 36b of the bolts 36 under substantial tension. As a result of this force, the portions 36c and the adjoining parts of the portions 36a of the bolts 36 are drawn upwardly through the respective die passages, the bolts 36 undergoing plastic deformation during passage through the tapering portions 40b of the die passages, as the respective parts of the portions 36a, 36c are reduced in diameter. Substantial energy is absorbed during such deformation, this energy being derived from the kinetic energy of the seat and its occupant, so that as compared with the abrupt deceleration of the part of the aircraft to which the brackets 16 are secured in the event of such a crash, the occupant of the seat undergoes a substantially reduced deceleration. The size and dimensions of the bolts 36 are so selected that drawing of the bolts 36 through the respective dies begins at a force acting between the frame 12 and the pillars 14 which corresponds to a deceleration of the occupant of the seat which is less than that which will occasion serious injury. The extent of the downward movement of the seat pan 10 relative to the frame 18 will, of course, depend upon the severity of the crash impact, and as much space as is practicable is left below the seat pan 10 to allow for such movement.

Figure 4:
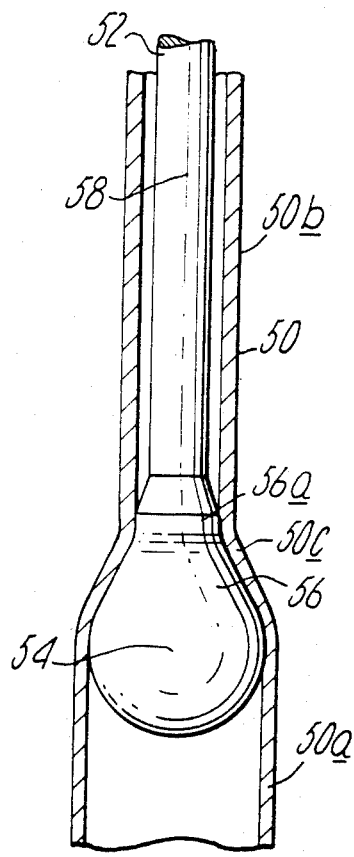
FIg. 4 is a fragmentary sectional view illustrating a variant seat arrangement.

There are, of course, other ways in which the deformation of a metal member or metal members may be utilised, in variants of the seat arrangement described, to absorb the kinetic energy of a person seated in the seat in the event of a crash. Thus, for example, referring to FIG. 4, in place of the bolts 36, there may be utilized energy-absorbing means comprising at least one deformable metal tube 50, (only part of which is shown in FIG. 4), the or each tube 50 receiving a, or a respective, mandrel 52 shown only partially in FIG. 4.

In this variant, the tube 50 has a portion 50a of larger internal and external diameter, a portion 50b of smaller internal and external diameter and a tapering portion 50c over which the internal and external diameters of the tube increase progressively, from those of the portion 50b at the junction between portions 50b and 50c to those of the portion 50a at the junctions of portions 50a and 50c. The mandrel 52 comprises a head 54 in the form of a ball or bulb, the widest portion of which is accommodated within the tube portion 50a, and a tapering portion 56 of which fits snugly within the tapering portion 50c of the tube and extends to a narrower portion 56a of the mandrel received in the portion 50b of the tube 50 adjacent the junction between portions 50b and 50c. The mandrel 52 has a shank 58 which extends from the mandrel head, coaxially within the tube portion 50b to a fixture (not shown), the shank 58 being of reduced diameter with respect to the interior of tube portion 50b. The mandrel shank 58 may be secured at its end remote from the head 54 to a suitable member, for example a cap member similar to the cap member 38 fixed with respect to the pillar 14 and the end of the larger diameter portion 50a of the tube 50 remote from the tapering portion 50c may be appropriately secured to the frame 12. Thus, in the event of an impact in which the downward motion of the seat arrangement is suddenly arrested, the tubular member 50 is drawn downwardly relative to the mandrel 52, so that the tapering portion 50c and the adjoining part of the smaller diameter portion 50b are drawn over the mandrel head 54 whilst being expanded radially, undergoing plastic deformation in the process and absorbing the kinetic energy of the seat and occupant in substantially the same way as described in relation to the embodiment of FIGS. 1 to 3.

Naturally, many variants of the embodiments described are possible. For example, in embodiments utilizing bolts and dies such as described in relation to FIGS. 1 to 3, the bolts might equally well be secured to the frame 12 and the dies carried by the pillars 14, for example by the cap members 38, with the dies being inverted and the larger diameter portions of the bolts extending upwardly from the dies. Similarly, in the variant described with reference to FIG. 4, the mandrel and tube combination shown may be inverted with the uppermost, larger diameter portion of each tube fixed with respect to the pillars 14 and the downwardly extending shank 52 of the mandrel secured to the frame 12.

In a yet further variant, a mandrel head might be formed at the upper end of each pillar 14, with each sleeve 20 having an upward extension corresponding to the tube 50 and adapted to be drawn downwardly over and expanded by the respective pillar 14 in the event of an impact.

In other arrangements, the deformation utilized for the absorption of energy may be the controlled bending or collapse of metal members.

It will be noted that the seat arrangement described with reference to the drawings is adapted to cases in which impact occurs from below, as this is the most likely circumstance where helicopters are concerned, and the seat arrangement shown in the drawings is particularly intended for use in a helicopter. However, it will be appreciated that a similar seat arrangement might be utilized in other forms of transport and the like in which the anticipated direction of impact was different, e.g. horizontal, and that in such cases the members corresponding to the pillars 14 and sleeves 20, or the analogous guide means would be arranged to allow, under deformation of the respective deformable members, relative movement between the structure including the seat pan and the structure secured to the aircraft, vehicle or the like, along the anticipated direction of impact.

I claim:

1. An energy-absorbing seat arrangement, comprising:
    a first structure including two parallel, generally vertical pillars, said pillars being elongated and having axes;
    a second structure including a frame mounted for sliding movement on said pillars, said frame having, for each pillar, a respective collar embracing the pillar slidably and a respective portion embracing the pillar slidably at a position spaced apart from the respective collar;

means for affixing a seat pan to one of said structures;

means for affixing the other of said structures to a vehicle; and connecting means for connecting said first and second structures, said connecting means including at least one plastically deformable metal member arranged to undergo controlled, predetermined plastic deformation, in the event that the force acting between said first and second structures in at least one predetermined direction exceeds a predetermined value, in such a way as to allow controlled, energy-absorbing movement to take place between said structures under action of said force, wherein said connecting means includes, for each pillar, a respective cap mounted at the end of the pillar so that the axis of the pillar runs through the respective cap, the cap being positioned nearer the respective collar of the frame than the respective portion thereof, and a plurality of respective energy absorbing devices supportively connecting the respective cap and collar, each energy absorbing device being elongated and including a plastically deformable metal member and a deforming member arranged to prevent sliding movement of said frame longitudinally relative to said pillars in at least one predetermined direction except by drawing of the plastically deformable metal member relative to the deforming member and consequent energy-absorbing deformation of the deformable member by the deforming member, one of said members being secured to said respective cap and the other of said members being secured to said respective collar, said plurality of respective energy absorbing devices being arranged symmetrically about the axis of the pillar and being parallel therewith, so that in the event that the force acting between the pillars and the frame in said predetermined direction parallel with the pillars exceeds a predetermined value, said frame will move slidingly along said pillars so as to draw the collars away from the respective caps and draw the deformable members relative to the deforming members.

2. The seat arrangement of claim 1, wherein at least one of the plastically deformable metal members comprises an elongated bolt having a first portion, a second portion with smaller cross-sectional dimensions than the first portion, and a tapering portion connecting the first and second portions, the end of the bolt that is nearer to the intersection of the tapering portion and the second portion than to the intersection of the tapering portion and the first portion being secured to one of the respective cap and collar, and wherein at least one of the deforming members comprises a drawing die having a tapering passage through which the tapering portion of the bolt extends, so that a force acting between said structures in a direction such as to place said bolt in tension will, if said force exceeds said predetermined value, cause said bolt to be drawn through said die while undergoing energy-absorbing deformation.

3. The seat arrangement of claim 1, wherein at least one of the plastically deformable metal members comprises an elongated tube having a first portion, a second portion with smaller internal cross-sectional dimensions than the first portion, and an internally tapering portion connecting the first and second portions, said first portion being fixed with respect to one of the respective collar and cap, and wherein at least one of the deforming members comprises a mandrel member having a head lodged within the first portion of the tube, a rod extending through the second portion of the tube to the other of the respective collar and cap, and a tapering neck connecting the head and rod and extending through the tapering portion of the tube, so that a force acting between said pillars and said frame in a direction such as to place said mandrel member in tension will, if said force exceeds said predetermined value, cause the mandrel member to be drawn through the tube expanding the tapering and second portions of the tube in an energy-absorbing deformation of the tube.

* * * * *